(12) United States Patent
Weidmer et al.

(10) Patent No.: US 7,717,652 B2
(45) Date of Patent: May 18, 2010

(54) TOOL WITH SELECTIVELY-BIASED MEMBER HAVING AN ADJUSTMENT FEATURE

(75) Inventors: Stan C. Weidmer, Cincinnati, OH (US); David C. Woodruff, Morrow, OH (US)

(73) Assignee: Makino, Inc., Mason, OH (US)

( * ) Notice: Subject to any disclaimer, the term of this patent is extended or adjusted under 35 U.S.C. 154(b) by 457 days.

(21) Appl. No.: 11/841,132

(22) Filed: Aug. 20, 2007

(65) Prior Publication Data
US 2007/0280793 A1    Dec. 6, 2007

Related U.S. Application Data

(63) Continuation-in-part of application No. 11/460,383, filed on Jul. 27, 2006, now Pat. No. 7,322,778, which is a continuation of application No. 11/125,879, filed on May 10, 2005, now Pat. No. 7,090,445.

(60) Provisional application No. 60/644,732, filed on Jan. 18, 2005.

(51) Int. Cl.
   *B23B 29/34* (2006.01)
(52) U.S. Cl. .............. 408/59; 82/1.5; 408/156; 408/714
(58) Field of Classification Search ........ 408/1 R, 408/57, 59, 147, 156–157, 154, 180, 714; 82/1.2–1.5; 175/61, 71, 268
See application file for complete search history.

(56) References Cited

U.S. PATENT DOCUMENTS

| | | | |
|---|---|---|---|
| 625,726 A | 5/1899 | Halifax | |
| 1,017,569 A | 2/1912 | Lewis, Sr. | |
| 1,594,114 A | 7/1926 | Prout | |
| 1,597,212 A | 8/1926 | Spengler | |

(Continued)

FOREIGN PATENT DOCUMENTS

DE    10 46 445    1/1953

(Continued)

OTHER PUBLICATIONS

Written Opinion, PCT Application No. PCT/US2005/006985, Aug. 2, 2005, pp. 1-9.

(Continued)

*Primary Examiner*—Daniel W Howell
(74) *Attorney, Agent, or Firm*—Frost Brown Todd LLC (57) ABSTRACT

A tool has a slot provided between a pair of extremities at its distal end. The extremities have cutting blades mounted thereon. The slot is configured to receive a plate. The tool has a conduit running along its axis for communication of pressurized fluid to the slot and plate. The plate directs flow of the pressurized fluid outward toward the extremities. The resulting outward force causes the extremities to bend outward, thereby urging the cutting blades outward for cutting, reaming, or other working of the workpiece. The resilience of the tool causes the extremities to return back inward when the fluid pressure is reduced. A plate may be configured to receive a wafer for transferring force from the pressurized fluid to the extremities. Some embodiments of the plate have an adjustment feature that is operable to selectively adjust the flow rate or pressure of fluid directed toward the extremities.

20 Claims, 11 Drawing Sheets

U.S. PATENT DOCUMENTS

| | | |
|---|---|---|
| 1,847,794 A | 3/1932 | Takeda |
| 2,085,976 A | 7/1937 | Heintz |
| 2,170,451 A | 8/1939 | Grant |
| 2,364,434 A | 12/1944 | Foster |
| 2,414,931 A | 1/1947 | Colwell et al. |
| 2,575,938 A | 11/1951 | Brenneke |
| 2,600,800 A | 6/1952 | Pace et al. |
| 2,618,182 A | 11/1952 | Tector |
| 2,825,250 A | 3/1958 | Bennett et al. |
| 3,007,356 A | 11/1961 | Jones |
| 3,063,763 A | 11/1962 | Zubrisky |
| 3,089,362 A | 5/1963 | Hill |
| 3,133,344 A | 5/1964 | Keasler |
| 3,343,390 A | 9/1967 | Harris |
| 3,389,621 A | 6/1968 | Wear |
| 3,554,305 A | 1/1971 | Kammerer, Jr. |
| 3,587,272 A | 6/1971 | Zmuda |
| 3,688,537 A | 9/1972 | Schneider |
| 3,735,615 A | 5/1973 | Shneider |
| 3,808,955 A | 5/1974 | Hamada et al. |
| 3,824,827 A | 7/1974 | Stockbridge et al. |
| 3,827,269 A | 8/1974 | Hoagland et al. |
| 3,888,146 A | 6/1975 | Tomenceak |
| 3,961,104 A | 6/1976 | Tanner |
| 4,178,725 A | 12/1979 | Goloff |
| 4,224,846 A | 9/1980 | Eysel et al. |
| 4,569,115 A | 2/1986 | Unno et al. |
| 4,602,539 A | 7/1986 | Tsukiji |
| 4,648,295 A | 3/1987 | Ley et al. |
| 4,651,599 A | 3/1987 | Ley |
| 4,706,417 A | 11/1987 | Gary |
| 4,706,483 A | 11/1987 | Perraudin |
| 4,785,648 A | 11/1988 | Budrean et al. |
| 4,941,782 A | 7/1990 | Cook |
| 5,174,695 A * | 12/1992 | Bathen et al. ............... 408/159 |
| 5,287,621 A | 2/1994 | Usui |
| 5,304,019 A | 4/1994 | Klee et al. |
| 5,325,695 A | 7/1994 | Seo et al. |
| 5,331,775 A | 7/1994 | Carmichael et al. |
| 5,368,420 A | 11/1994 | Gerk et al. |
| 5,441,439 A | 8/1995 | Grimm et al. |
| 5,540,526 A | 7/1996 | Hyatt et al. |
| 5,630,953 A | 5/1997 | Klink |
| 5,655,955 A | 8/1997 | Nagel et al. |
| 5,730,036 A | 3/1998 | Ozaki et al. |
| 5,775,853 A | 7/1998 | Keefer et al. |
| 5,779,155 A | 7/1998 | Schennum et al. |
| 5,782,585 A | 7/1998 | Bathen |
| 5,800,252 A | 9/1998 | Hyatt |
| 5,829,925 A | 11/1998 | Nordstrom |
| 5,862,700 A | 1/1999 | Klein |
| 5,865,573 A | 2/1999 | Kress |
| 5,916,317 A | 6/1999 | Willoughby et al. |
| 5,931,038 A | 8/1999 | Higashi |
| 5,975,987 A | 11/1999 | Hoopman et al. |
| 6,196,773 B1 | 3/2001 | Hyatt et al. |
| 6,227,082 B1 | 5/2001 | Hormansdorfer et al. |
| 6,238,150 B1 | 5/2001 | Yamada et al. |
| 6,243,962 B1 * | 6/2001 | Brock .................. 33/542 |
| 6,253,724 B1 | 7/2001 | Han |
| 6,270,295 B1 | 8/2001 | Hyatt et al. |
| 6,295,854 B1 | 10/2001 | Stein et al. |
| 6,315,503 B1 | 11/2001 | Oswald et al. |
| 6,470,724 B1 | 10/2002 | Friese |
| 6,503,031 B1 | 1/2003 | Chaet et al. |
| 6,527,623 B1 | 3/2003 | Bowers |
| 6,536,998 B2 | 3/2003 | Hyatt et al. |
| 6,585,571 B2 | 7/2003 | Hyatt et al. |
| 6,729,810 B2 | 5/2004 | Hyatt et al. |
| 6,779,953 B2 * | 8/2004 | Suzuki et al. ............... 408/147 |
| 6,926,475 B2 | 8/2005 | Kress et al. |
| 7,090,445 B2 | 8/2006 | Woodruff et al. |
| 2002/0194693 A1 | 12/2002 | Wu |
| 2003/0133738 A1 | 7/2003 | Hall et al. |
| 2003/0177804 A1 | 9/2003 | Luthy |
| 2006/0257219 A1 | 11/2006 | Woodruff et al. |

FOREIGN PATENT DOCUMENTS

| | | |
|---|---|---|
| DE | 34 08 352 | 9/1985 |
| DE | 41 24 538 | 7/1991 |
| EP | 1 405 689 | 4/2004 |
| GB | 878281 | 9/1961 |
| JP | 54014088 | 2/1979 |
| JP | 2003311517 A * | 11/2003 |
| SU | 437573 | 1/1975 |

OTHER PUBLICATIONS

EPC Invitation to Correct EP Application 03-7590219.3-3202, Mar. 29, 2006.
Office Action, U.S. Appl. No. 11/125,879, filed Dec. 19, 2005, pp. 1-7.
Search Report, PCTUS2005/007348, Jun. 27, 2005.
Search Report, PCT/US2005/006985, Aug. 2, 2005.
International Search Report dated Nov. 5, 2008 for Application No. PCT/US2008/072576.

* cited by examiner

TOOL WITH SELECTIVELY-BIASED MEMBER HAVING AN ADJUSTMENT FEATURE

PRIORITY

This application is a continuation-in-part of prior, co-pending U.S. patent application Ser. No. 11/460,383, filed Jul. 27, 2006, published as U.S. Pub. No. 2006/0257219; which is a continuation of prior patent application Ser. No. 11/125,879, filed May 10, 2005, now U.S. Pat. No. 7,090,445; which claims priority from the disclosure of U.S. Provisional Patent Application Ser. No. 60/644,732, entitled "Tool with Selectively-Biased Member," filed Jan. 18, 2005. Each of the foregoing patent applications, including U.S. Pub. No. 2006/0257219 and U.S. Pat. No. 7,090,445, is incorporated by reference herein.

BACKGROUND OF THE INVENTION

Embodiments of the present invention relates generally to boring and reaming tools, and are particularly directed to a radially-adjustable tool that may form or ream a bore having a relatively high length-to-diameter ratio.

In some conventional machining center rotating tools, lubricant is supplied to the vicinity of the cutting blade through the rotating shaft. An example is shown in U.S. Pat. No. 5,775,853 issued on Jul. 7, 1998, the disclosure of which is herein incorporated by reference. Another example is shown in U.S. Pat. No. 6,270,295 issued on Aug. 7, 2001, the disclosure of which is herein incorporated by reference. Yet another example is shown in U.S. patent application Ser. No. 10/654,328 filed on Sep. 3, 2003, the disclosure of which is herein incorporated by reference. While a variety of tools, systems, and methods have been made and used to machine a workpiece, it is believed that no one prior to the inventors has made or used a tool as described in the appended claims.

BRIEF DESCRIPTION OF THE DRAWINGS

The accompanying drawings incorporated in and forming a part of the specification illustrate several aspects of the present invention, and together with the description serve to explain the principles of the invention; it being understood, however, that this invention is not limited to the precise arrangements shown. In the drawings, like reference numerals refer to like elements in the several views. In the drawings.

Reference will now be made in detail to various embodiments of the invention, examples of which are illustrated in the accompanying drawings.

DETAILED DESCRIPTION OF EMBODIMENTS OF THE INVENTION

Figure 1:
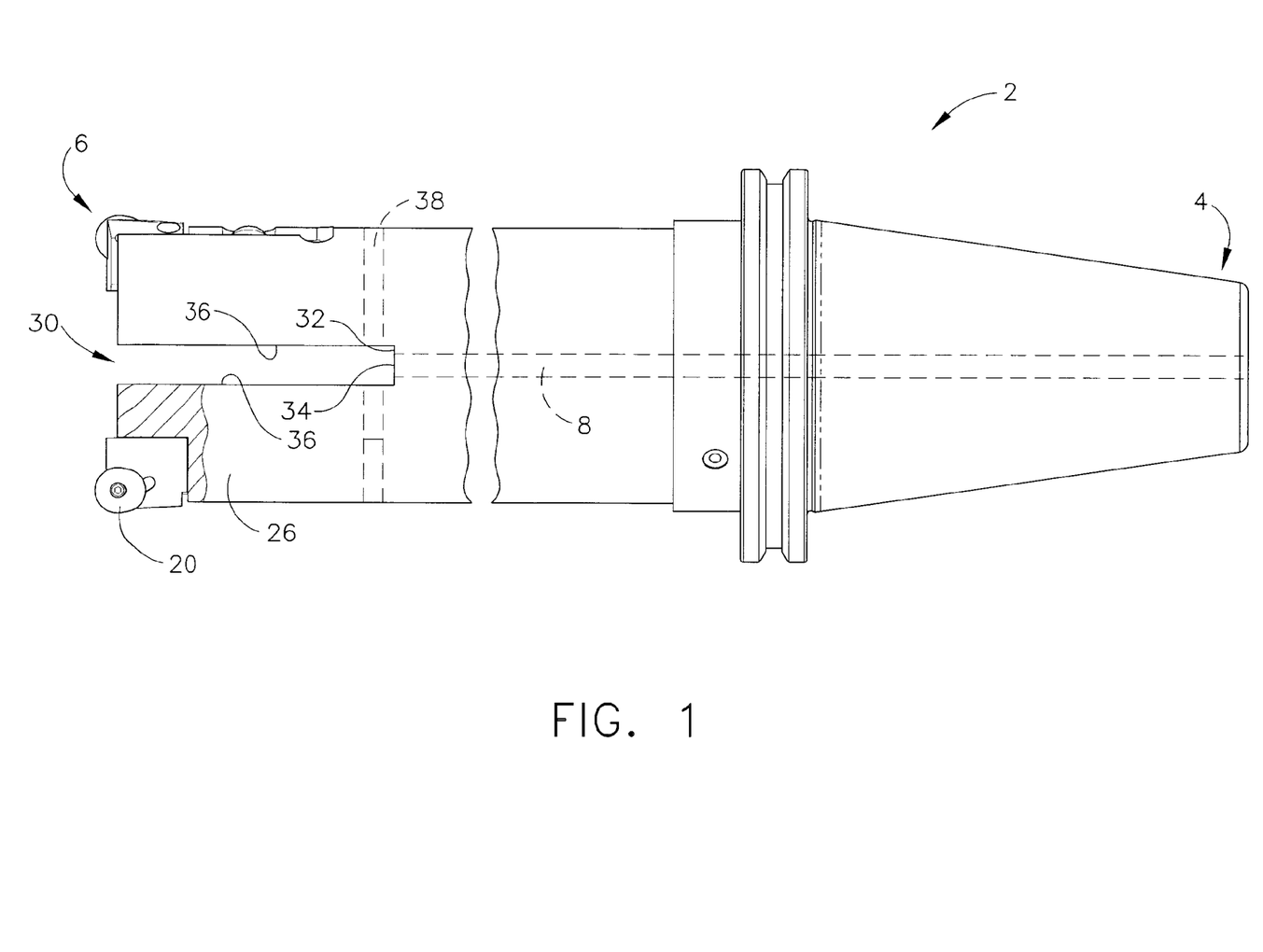
FIG. 1 is a partial cross-sectional side view of a tool constructed in accordance with the present invention.
Figure 2:
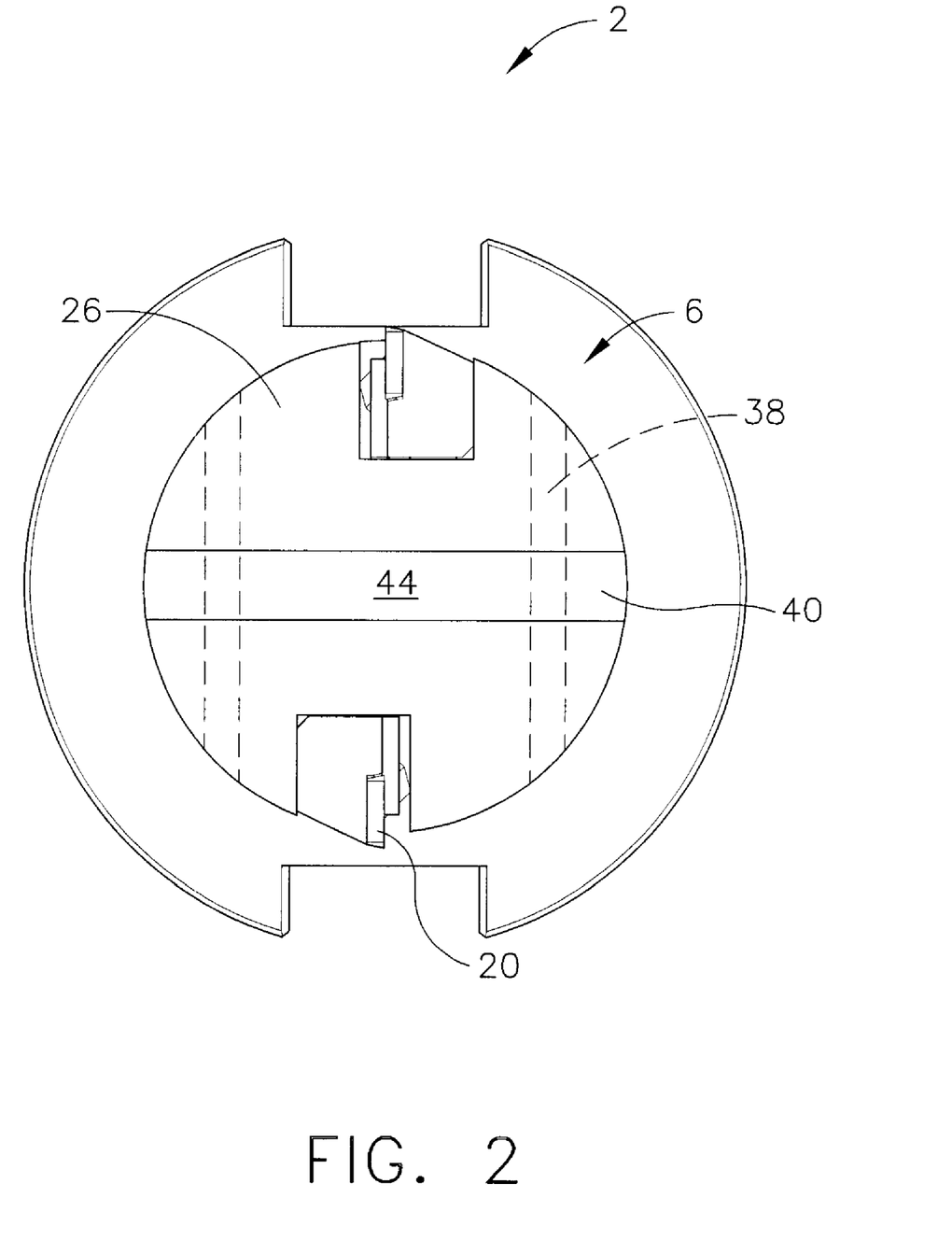
FIG. 2 is an end view of the tool of FIG. 1.

Referring now to the drawings in detail, wherein like numerals indicate the same elements throughout the views, FIGS. 1 and 2 show a tool 2 having proximal end 4 and distal end 6. Conduit 8 runs along the axis of tool 2 from proximal end 4 toward distal end 6. As used herein, the term "conduit" is intended to include any channel or other structure or configuration through which fluid, materials, and the like may be conveyed, passed, or otherwise communicated. In the present example, conduit 8 is configured to permit communication of a fluid medium through tool 2. However, those of ordinary skill in the art will appreciate that other suitable configurations may be used to permit fluid communication.

In the present example, tool 2 is adapted for use with a machining station having a selectively rotatable machine spindle, and may quickly and easily receive and secure one of a plurality of tools for various operations (e.g., rotating, vibrating, oscillating, etc.). A machining station may have a synchronized system, such as an automatic tool changer for quickly and easily interchanging and utilizing multiple machining tools at one machining station, thereby allowing the machining station to provide greater utility or range of operations. Tool 2 is further configured for use with a source of a pressurized fluid medium for communication to conduit 8 in tool 2. The machining station permits a user to selectively control both the speed of tool 2 rotation and the pressure of the fluid medium being communicated to conduit 8. In one embodiment, the fluid medium is capable of providing lubrication and/or cooling of at least a portion of the interface between tool 2 and a workpiece.

In the present example, tool 2 is attachable to a selectively rotatable spindle at proximal end 4, and receives the pressurized fluid medium at proximal end 4. In this way, the interface of machining station and proximal end 4 of tool 2 is quite similar to the corresponding interface described in U.S. Pat. No. 6,270,295.

Figure 3:
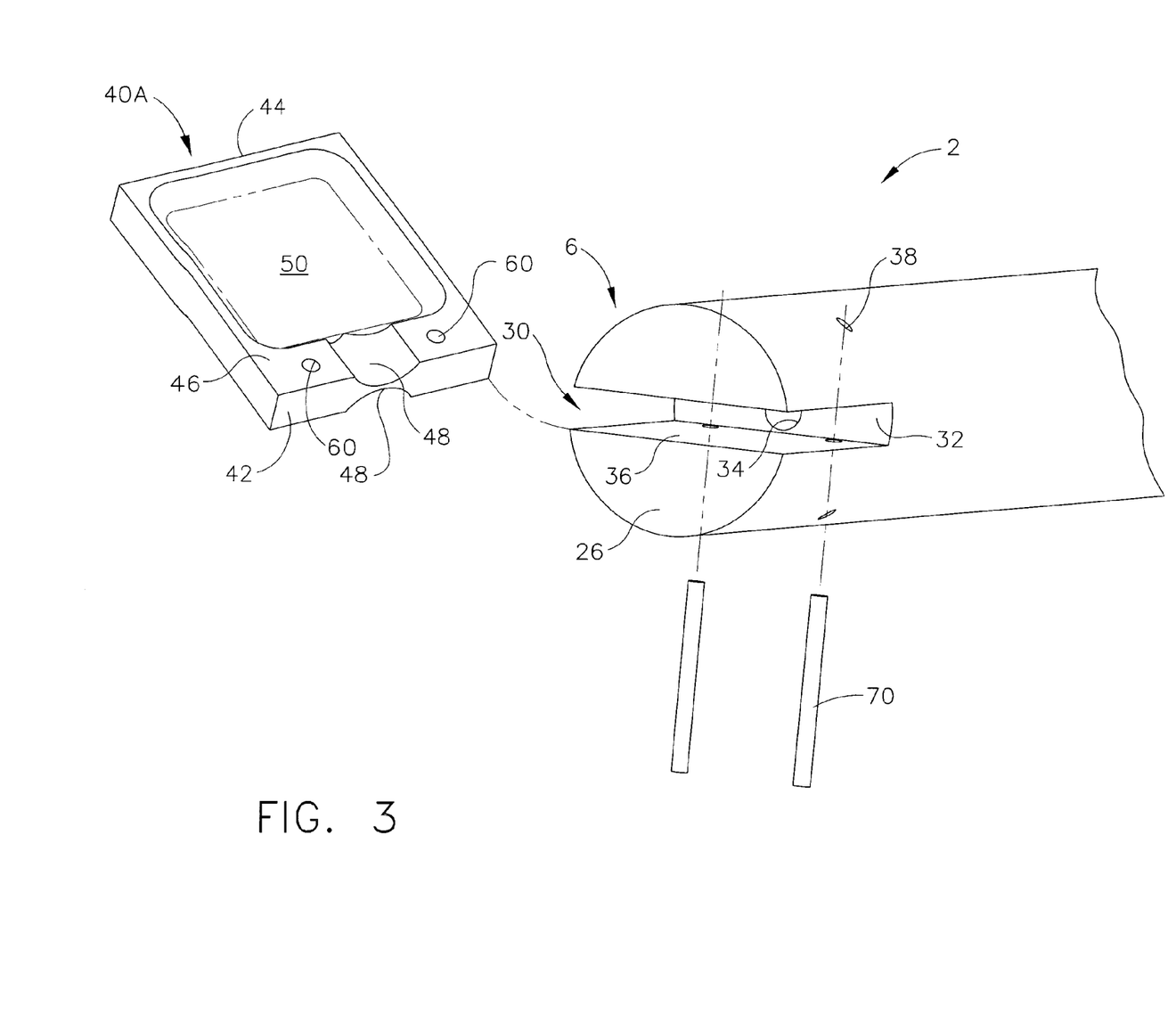
FIG. 3 is an exploded perspective view of the tool of FIG. 1.

Distal end 6 of tool 2 includes a pair of opposing cutting blades 20 mounted on extremities 26. FIG. 1 includes partial cross section of extremity 26 to show cutting blade 20. Slot 30 is defined between pair of extremities 26, and has plate 40A (not shown in FIG. 1) disposed therein. As shown in FIG. 3, which omits several elements of tool 2 for simplicity, dowel pins 70 may be used to hold plate 40A within slot 30. Other suitable distal end 6 configurations will be apparent to those of ordinary skill in the art, including but not limited to inserted members other than plate 40A.

Slot 30 is generally rectangular, and is defined by proximal surface 32 and two side surfaces 36. Proximal surface 32 has opening 34 along the axis of tool 2 for fluid communication with conduit 8. Each side surface 36 has a pair of pin openings 38. Each pin opening 38 extends completely through corresponding extremity 26 in a direction transverse the axis of tool 2, and is configured to receive dowel pin 70. Other suitable slot 30 configurations will be apparent to those of ordinary skill in the art.

By way of example only, distal end 6 of tool 2 may have a diameter of approximately 8 inches, 2 inches, 1.25 inches, 1 inch, or 32 mm. Slot 30 may have a width (i.e. distance between side surfaces 36) of approximately 0.375 inches or 5 mm. Of course, any other suitable dimensions may be used for tool 2 diameter and/or slot 30 width. Slot 30 may be 2.6 inches deep (i.e. distance from distal end of tool 6 to proximal surface 32 of slot 30 is 2.6 inches), 3.321 inches deep, or any other suitable depth.

Plate 40A has proximal end 42, distal end 44, and a pair of side surfaces 46. Plate 40A also has a pair of pin openings 60 formed through side surfaces 46, each opening 60 being configured to receive dowel pin 70. Plate 40A is configured to fit in slot 30, such as by an interference fit. Such an interference fit may be obtained where plate 40A has a thickness that is 0.001" greater than the width of slot 30, by way of example only. In one embodiment, slot 30 has a width of 0.374" while plate 40A has thickness of 0.375". Other suitable relative dimensions of slot 30 and plate 40A for producing any type or degree of interference fit will be apparent to those of ordinary skill in the art. Alternatively, slot 30 and plate 40A may be dimensioned such that the fit is not an interference fit. By way of example only, slot may have a width of 0.375" while plate 40A has a thickness of 0.374". In addition, plate 40A may be dimensioned such that its exposed outer surfaces are flush with or slightly recessed from the outer surfaces of tool 2.

FIG. 3 shows plate 40A, a simplified rendering of tool 2, and dowel pins 70 prior to insertion of plate 40A in slot 30. In the present example, with plate 40A properly positioned within slot 30, pin openings 38 of slot 30 align with pin openings 60 of plate 40A, such that dowel pins 70 may be placed through pin openings 38, 60 to secure plate 40A within slot 30. Alternatively, any other suitable configuration for securing plate 40A within slot 30 may be used.

In the present example, each side surface 46 of plate 40A has recess 50 formed therein. Each recess 50 has channel 48, also formed in respective side surface 46, leading to proximal end 42. Each channel 48 is configured to permit fluid communication to corresponding recess 50. In the present example, with plate 40A properly positioned within slot 30, each channel 48 will be in fluid communication with opening 34 in proximal surface 32 of slot 30, such that fluid may be communicated through conduit 8, through opening 34, and through channel 48 to reach each recess 50 in plate 40A. Alternatively, any other suitable configuration may be used to facilitate communication of a fluid medium to each recess 50.

Figure 4:
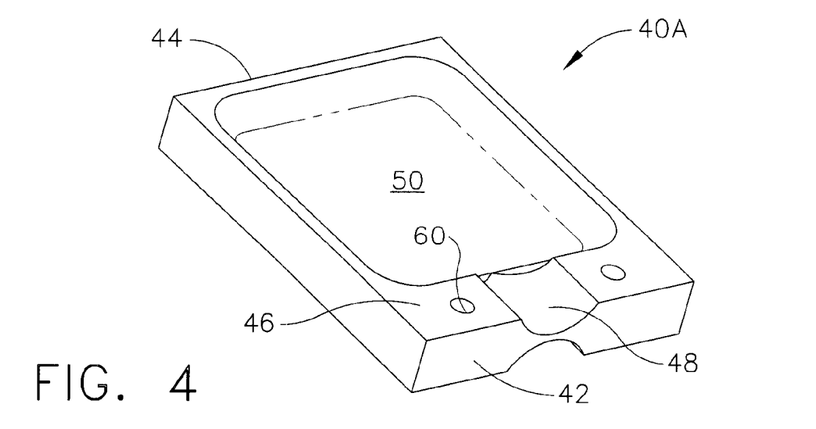
FIG. 4 is a perspective view of an embodiment of a plate for the tool of FIG. 1.
Figure 5:
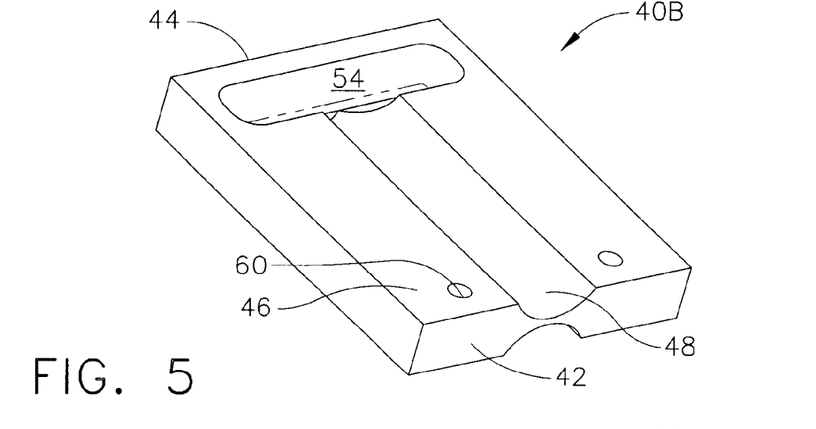
FIG. 5 is a perspective view of an embodiment of a plate for the tool of FIG. 1.
Figure 6:
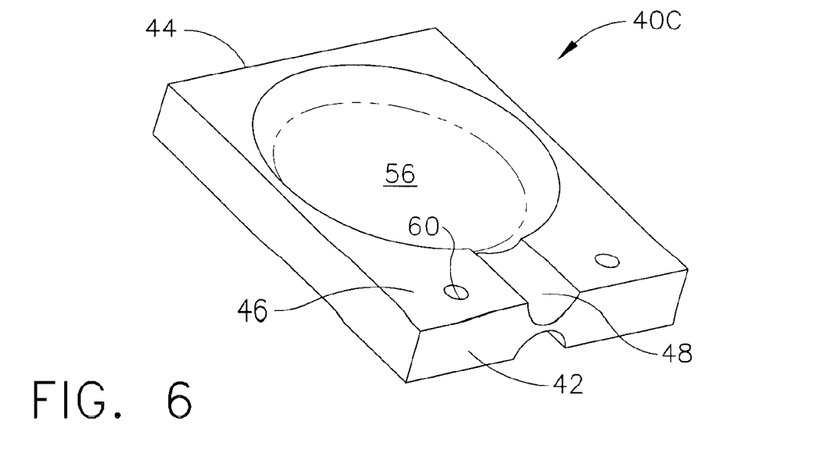
FIG. 6 is a perspective view of an embodiment of a plate for the tool of FIG. 1.

It will be appreciated that plate 40A may be modular in nature, such that a variety of types of plates 40A may be inserted in slot 30. An aspect of plate 40A that may be modified for such varying plate 40A types may be the configuration of recesses 50. As shown in FIGS. 3 and 4, recesses 50 may be generally rectangular in shape. Alternatively, as shown in FIG. 5, recesses 54 in plate 40B may be generally "T"-shaped. In yet another embodiment, shown in FIG. 6, recesses 56 in plate 40C are generally circular. Plate 40A configurations may also be varied as a function of recess 50 size, in addition to, or instead of, recess 50 shape. In one embodiment, recesses 50 on respective side surfaces 46 of plate 40A have substantially the same size and shape. Alternatively, recesses 50 on plate 40A may be sized and/or shaped differently. Still other suitable recess 50 configurations and variations will be apparent to those of ordinary skill in the art.

Plate 40A may be made of any suitable material or materials. By way of example only, plate 40A may be made of steel, aluminum, plastic, or any other suitable material, including combinations thereof.

Figure 7:
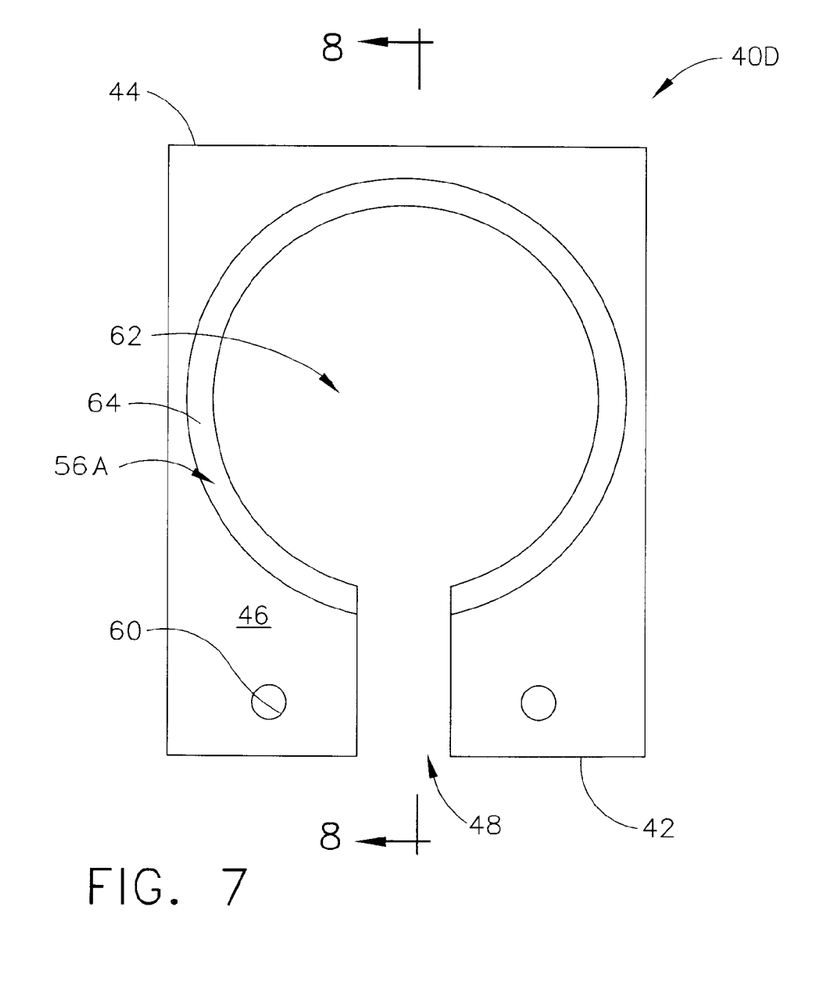
FIG. 7 is a front elevational view of an embodiment of a plate for the tool of FIG. 1 configured to receive a wafer.
Figure 8:
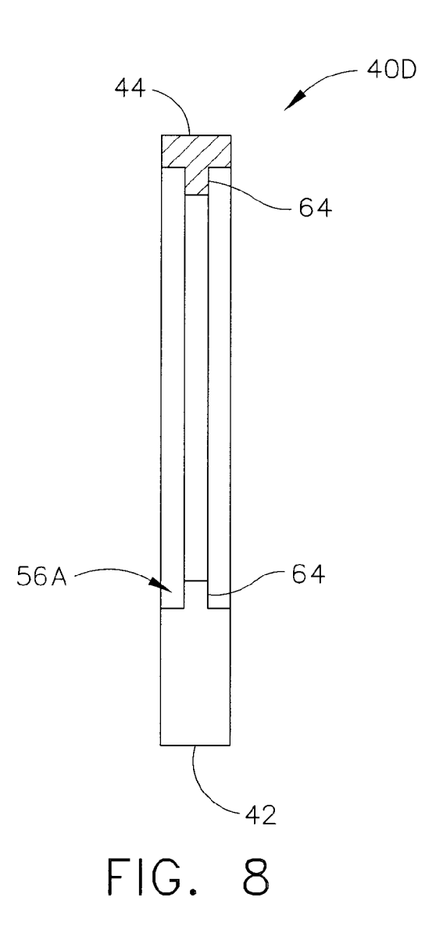
FIG. 8 is a cross-sectional side view of the plate of FIG. 7 taken along line 8-8.
Figure 9:
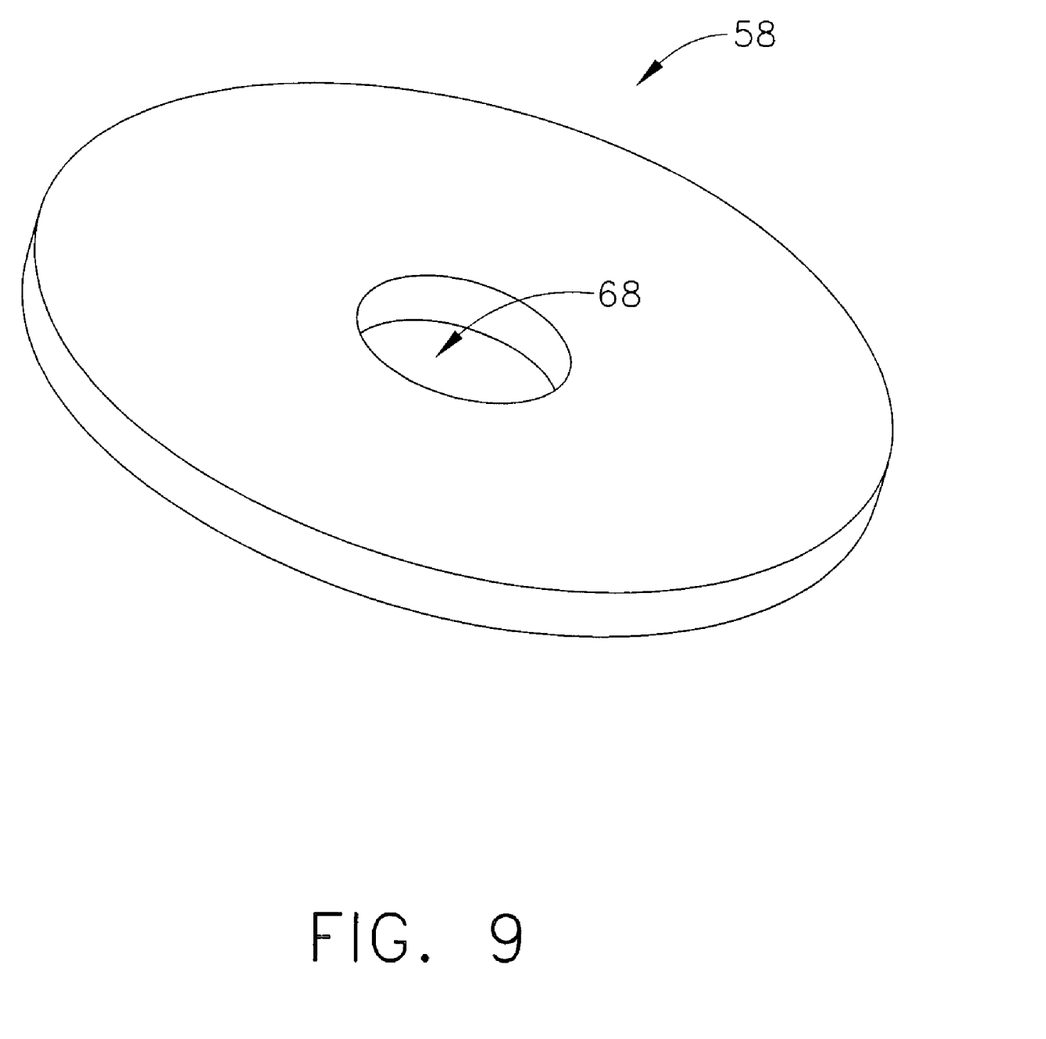
FIG. 9 is a perspective view of an embodiment of a wafer configured to fit in the plate of FIG. 7.

In an alternate embodiment, shown in FIGS. 7 through 9, plate 40D is configured to receive wafer 58. In this embodiment, plate 40D has center opening 62 formed therethrough. Opening 62 is in fluid communication with channel 48 in proximal end 42 of plate 40D. Opening 62 is defined by inner annular ridge 64, which is recessed within plate 40D to provide recess 56a.

An exemplary removable wafer is shown in FIG. 9. Wafer 58 may be positioned within recess 56a. As shown, shape of wafer 58 corresponds to shape of recess 56a. While wafer 58 is shown as generally circular to correspond with generally circular recess 56a, it will be appreciated that wafer 58 may correspond to any other shape. By way of example only, wafer 58 may be generally square to correspond with generally square recess 50, generally "T"-shaped to correspond with generally "T"-shaped recess 54, or any other shape to correspond with a different recess. Alternatively, wafer 58 may be shaped differently than recess 50 in which it is disposed, such that they do not correspond.

It will also be appreciated that wafer 58 may be used with any of plates 40A-C that lacks opening 62. In such an embodiment, wafer 58 may include a channel or conduit to facilitate entry of fluid into space between wafer 58 and recess 50. Alternatively, any of plates 40A-C may include an opening in addition to or as an alternative to recesses 50, 54, 56. Other combinations and variations will be apparent to those of ordinary skill in the art.

In one embodiment, annular ridge 64 is recessed 0.125" within plate 40D (i.e. the distance between annular ridge 64 and side surface 46 is 0.125"), while wafer 58 has a thickness of 0.1127". Recess 56a has a diameter of 2.4", while wafer 58 has a diameter of 2.35". Alternatively, recess 56a and wafer 58 are sized such that there is an interference fit between wafer 58 and plate 40D. Still other suitable dimensions for plate 40D and/or wafer 58 will be apparent to those of ordinary skill in the art.

During use of plate 40D having wafer 58 inserted in recess 56a, pressurized fluid communicated to and through channel 48 reaches opening 62, where it exerts an outward force on wafer 58. Wafer 58, in turn, exerts outward force on extremity 26 of tool 2. Thus, rather than having fluid exert force on extremity 26 directly, fluid exerts force on extremity 26 via wafer 58.

Wafer 58 configuration may be varied by size, shape, and/or by having one or more openings 68 formed in wafer 58. Such an opening 68 may permit some fluid to escape therethrough. Such escaping fluid may exert some force directly on extremity 26. By way of example only, wafer 58 with an opening 68 formed in its center may provide characteristics that differ from a wafer that has no opening. Alternatively, one wafer 58 that has an opening 68 of a first size may provide characteristics that differ from wafer 58 that has opening 68 of a different, second size.

In one embodiment, wafer 58 has opening 68 with a diameter of 0.475". Of course, the number and/or size of opening(s) 68 may vary greatly.

It will be appreciated that the size, shape, and/or number of openings 68 in wafer 58 may relate to the force exerted by wafer 58 on extremity 26. In addition, the size and/or number of openings 68 in wafer 58 may relate to the amount of fluid permitted to leak from tool 2. Other embodiments and uses for opening(s) 68 in wafer 58 will be apparent to those of ordinary skill in the art.

Wafer 58 may be made of any suitable material or materials. By way of example only, wafer 58 may be made of polyurethane, brass, or any other suitable material, including combinations thereof. In one embodiment, the material of which wafer 58 is made is softer than the material of which plate 40D is made. Alternatively, the respective materials may be of any other suitable relative hardness.

Of course, wafer 58 may be eliminated altogether. As will be apparent from the foregoing examples, the term "wafer" shall be broadly construed to include any member that may be inserted in recess 50, 54, 56, 56*a* of plate 40A-D.

Those of ordinary skill in the art will also appreciate the various tool 2 properties that may be varied by using plates 40D having different recess 50 and/or wafer 58 configurations or properties. By way of example only, the fluid pressure required to cause outward bending of extremities 26 may vary depending on recess 50 configuration. In addition, or in the alternative, the rate at which the diametric distance between cutting blades 20 varies with fluid pressure may be a function of recess 50 and/or wafer 58 configuration. Still other effects of varying plate 40D, recess 50 through 56*a*, and/or wafer 58 configuration will be apparent to those of ordinary skill in the art.

During use, such as when tool 2 is being used to cut a bore having a high length-to-diameter ratio in a workpiece, by way of example only, a user may selectively adjust the pressure of fluid being communicated to tool 2. Of course, the same may be true for other cutting bores. Those of ordinary skill in the art will recognize that such pressure adjustments of communicated fluid will also adjust the pressure of fluid within tool 2. As the fluid pressure is increased, the fluid will be directed outward by recesses 50 in side surfaces 46 of plate 40A, thereby exerting an increasing, outward force against side surfaces 36 of slot 30 (i.e. outward force increases with fluid pressure). When the fluid pressure reaches a sufficient level, this force will cause extremities 26 to bend radially outward (i.e. side surfaces 36 of slot will be deflected outward by the fluid), thereby urging cutting blades 20 radially outward. This will increase the effective diameter of distal end 6 of tool 2. By way of example only, such diametric expansion may be achieved with fluid pressures ranging from approximately 200 psi to 800 psi. Of course, other fluid pressure amounts may cause expansion based on a variety of factors (e.g. tool material, fluid density, thickness of extremities, etc.).

Accordingly, extremities 26 and slot 30 may constitute a selective bias portion of tool 2. In other words, extremities 26 and slot 30 are configured to selectively bias cutting blades 20 to a variety of use positions. Of course, a selective bias portion of tool 2 may include other elements.

In the present example, the radial positioning of cutting blades 20 with respect to the axis of tool 2 may be adjusted according to the pressure of the fluid being communicated to and through tool 2, such that increasing fluid pressure will increase the diametric distance between cutting blades 20. Accordingly, tool 2 may be used to cut or ream bores of different diameters, as the diametric distance between cutting blades 20 may be varied as a function of fluid pressure. In one embodiment, when fluid pressure is decreased, the resilience of the material of which tool 2 is made causes extremities 26 to return back (i.e. radially inward) to their prior configuration. Such resilience may be found where tool 2 is made of steel or any other metal, alloy, or the like. Other suitable materials for making tool 2 will be apparent to those of ordinary skill in the art. In addition, other ways in which extremities 26 may be caused to return back to a prior configuration will be apparent to those of ordinary skill in the art (e.g. inducing a vacuum condition in conduit 8, magnetically or mechanically pulling extremities together, etc.).

It will be appreciated that, in the present example, the pressurized fluid will tend to leak at distal end 6 of tool 2 during use of tool 2. This leakage will occur at distal end 6 between side surfaces 36 of slot 30 and side surfaces 46 of plate 40A. In other words, the outward bending of extremities 26 will tend to create gaps between side surfaces 36 of slot 30 and side surfaces 46 of plate 40A, and the pressurized fluid will leak from these gaps. It will be appreciated that, due to the proximity of such gaps to cutting blades 20, the leaking fluid may easily reach at least a portion of the interface between tool 2 and the workpiece. This will be particularly so considering the relatively high pressure of the fluid when it leaks, such that the fluid will tend to spray out from the gaps at a high velocity. Such spraying leakage may provide cooling and/or lubrication of the interface between tool 2 and the workpiece. Accordingly, the suitability for cooling and/or lubricating such interfaces may be considered during the selection of a fluid to be communicated through conduit 8 of tool 2.

Figure 10A:
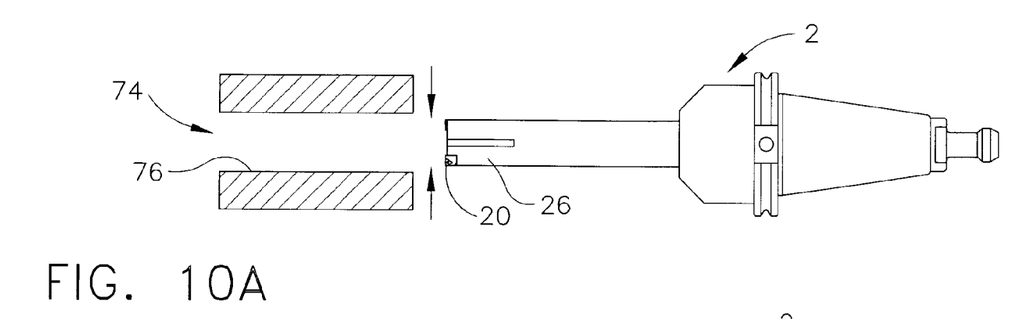
FIGS. 10A through 10E are series views of the tool of FIG. 1 in use.
Figure 10B:
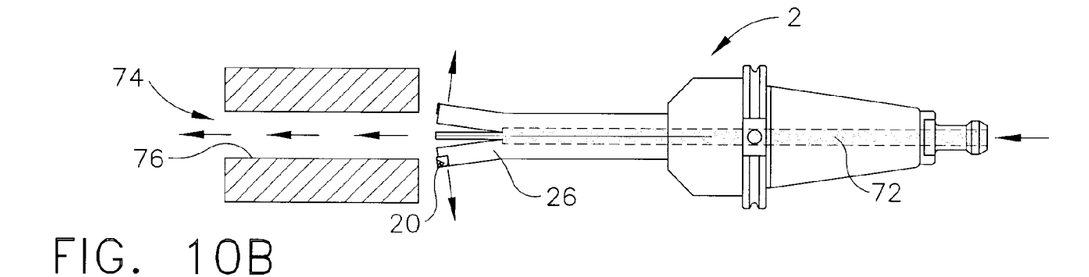
Figure 10C:
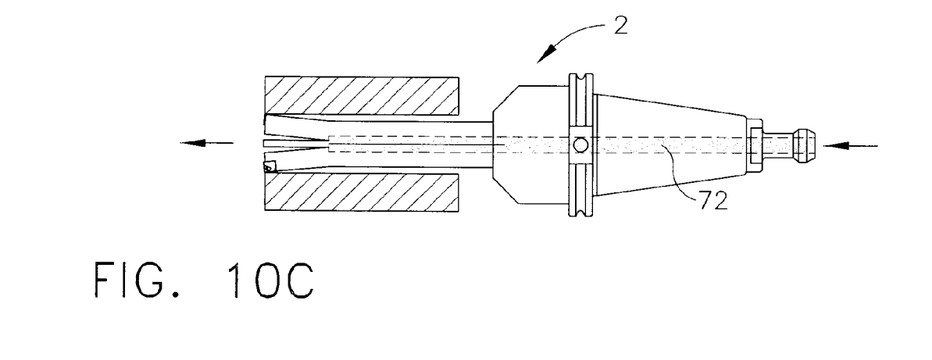

Those of ordinary skill in the art will appreciate the speed with which tool 2 may be used to cut or ream multiple bores in a given time frame. The following merely illustrative example, portions of which are shown in FIGS. 10A through 10E, outlines a method by which tool 2 may be used to produce several bores in a relatively short time. First, as shown in FIG. 10A, rotation of tool 2 is initiated by spindle at a machining station (not shown). Next, as shown in FIG. 10B, the pressure of fluid 72 being communicated to tool 2 (and hence, through tool 2) is increased to a level sufficient to cause extremities 26 to bend outward until cutting blades 20 are separated at a desired diametric distance. Then, as shown in FIG. 10C, rotating tool 2 is linearly advanced along the axis of bore 74, such that the axis of tool 2 is aligned with the axis of bore 74. It will be appreciated that, during this stage of advancement, cutting blades 20 of tool 2 will engage with surface of bore wall 76 in a cutting or reaming fashion.

Figure 10D:
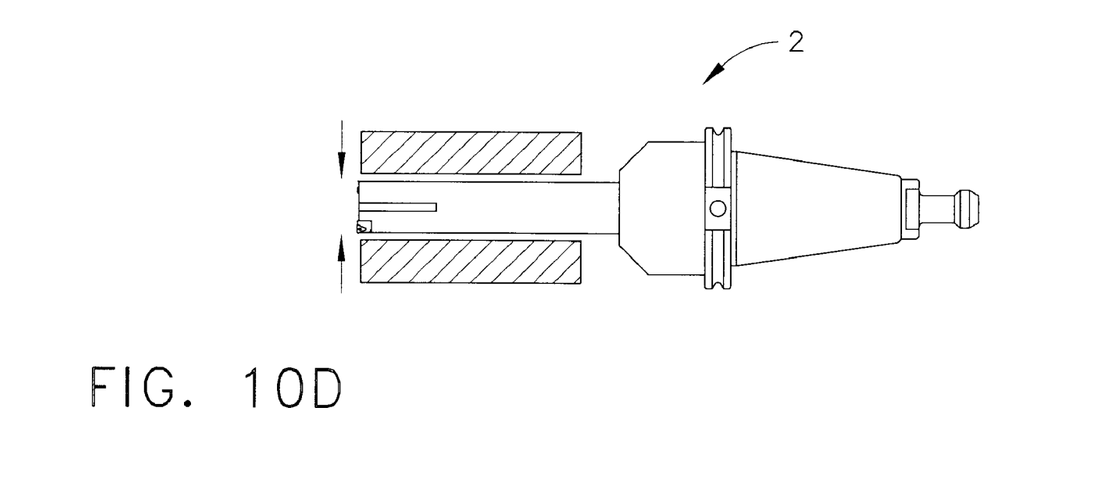
Figure 10E:
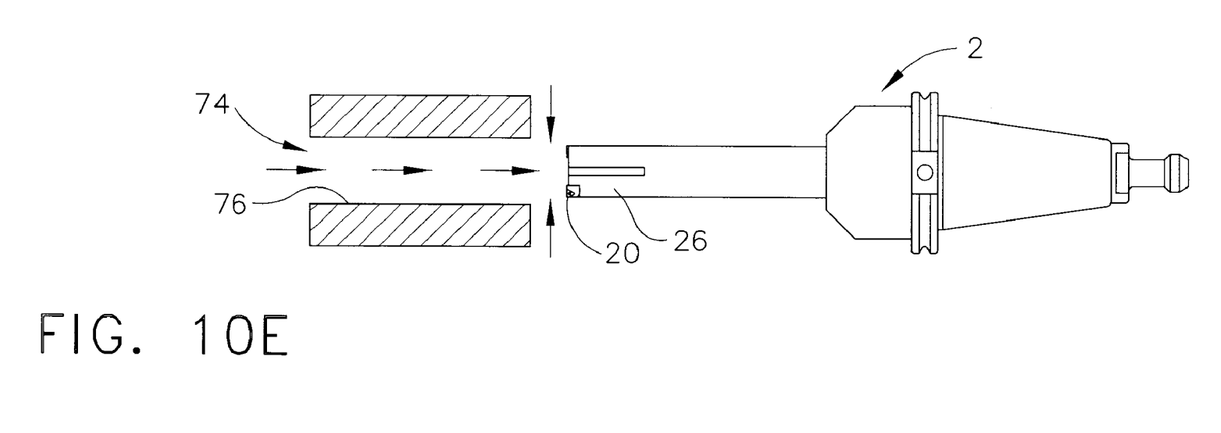
Figure 11:
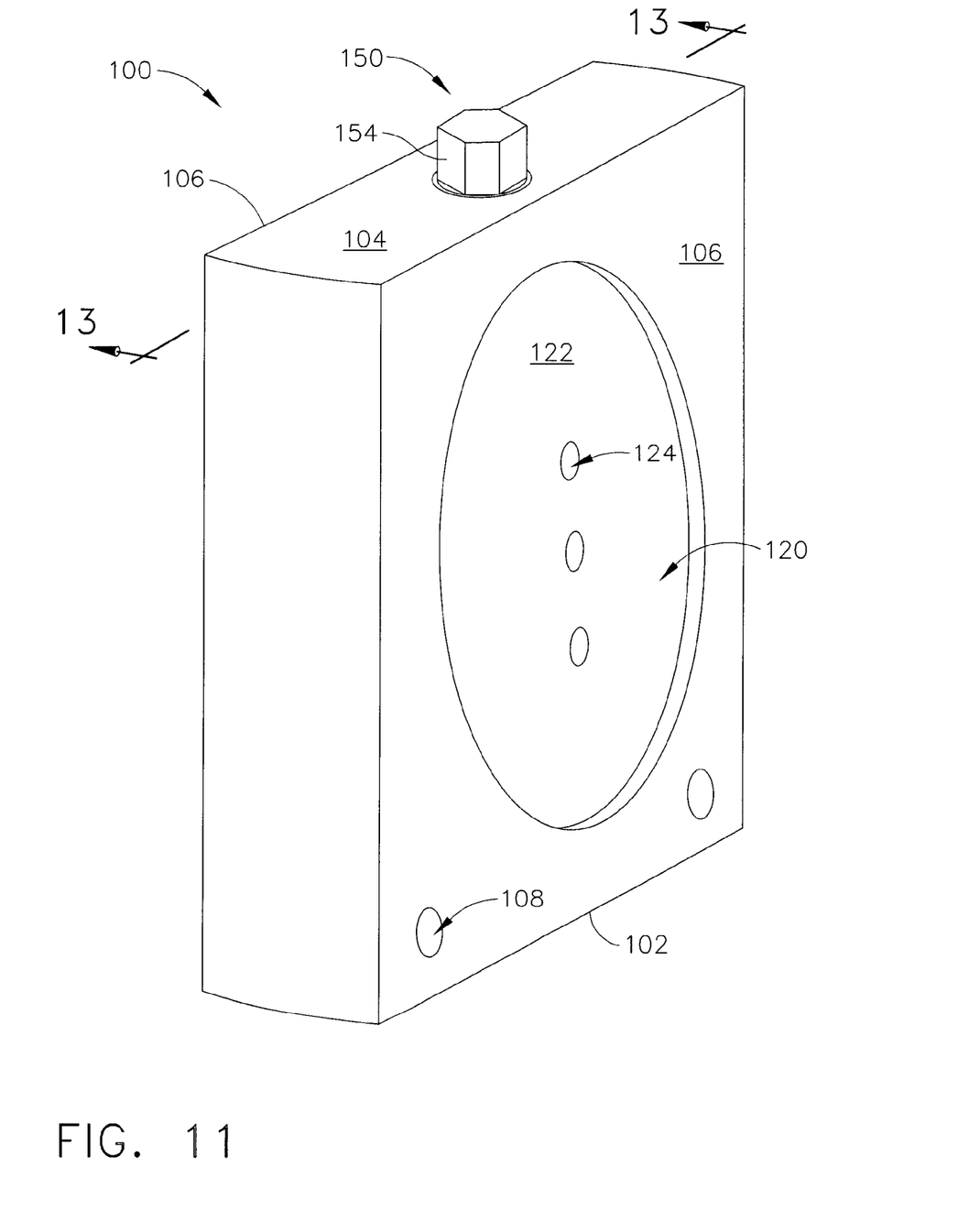
FIG. 11 is a perspective view of an alternative plate for the tool of FIG. 1.
Figure 12:
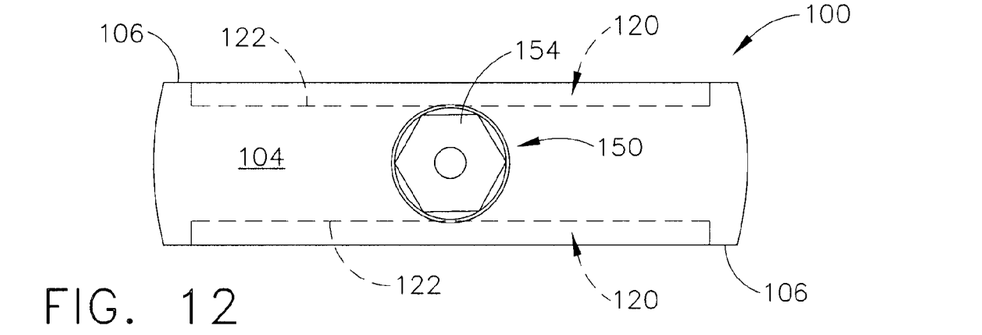
FIG. 12 is a top end view of the plate of FIG. 11.
Figure 13:
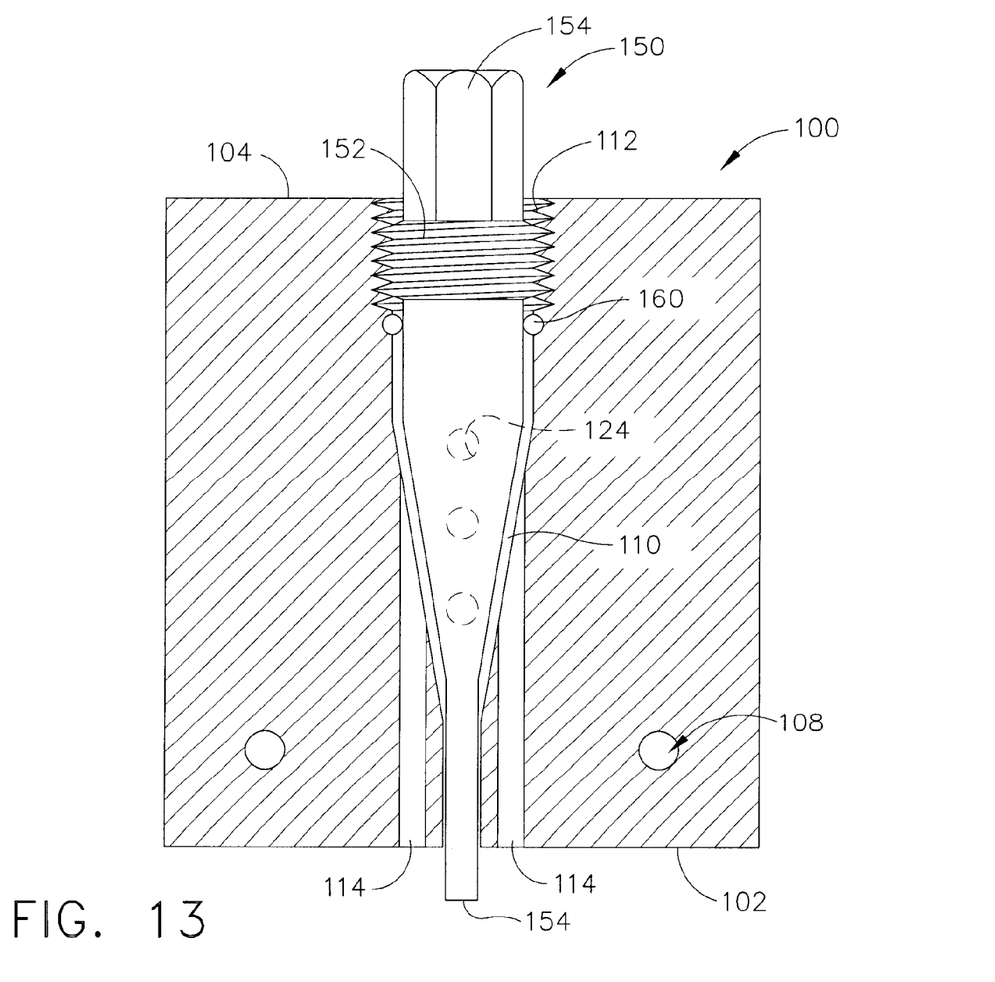
FIG. 13 is a cross-sectional view of the plate of FIG. 11, taken along line 13-13 of FIG. 12.
Figure 14:
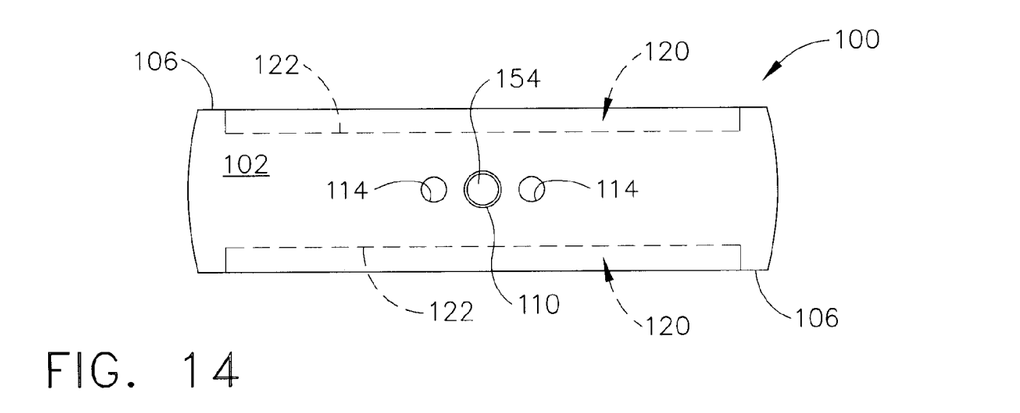
FIG. 14 is a bottom end view of the plate of FIG. 11.

When tool 2 has been advanced into bore 74 to the desired length (e.g., such that cutting blades 20 have passed completely through bore 74 or to its desired end), fluid 72 pressure in tool 2 may then be reduced, as shown in FIG. 10D. This reduction in fluid 72 pressure will proportionally reduce the magnitude of the radially outward forces immediately being exerted against side surfaces 36 of slot 30 by fluid 72 being deflected by respective recesses 50 in plate 40A (or by wafer 58, as the case may be). This reduction of force will permit the resilience of the material comprising distal end 6 of tool 2 to cause extremities 26 to return back radially inward, thereby decreasing the diametric distance between cutting blades 20. This decrease in the diametric distance between cutting blades 20 will nearly instantaneously cause disengagement of cutting blades 20 with bore wall 76. As shown in FIG. 10E, tool 2 may then be linearly withdrawn from bore 74 along the axis of bore 74. Tool 2, while still rotating, may then be moved to the next bore for a similar process. Alternatively, the workpiece may be moved to align the axis of the next bore with the axis of tool 2 before the process is repeated.

Accordingly, the rotation of tool 2 may be kept substantially constant as tool 2 cuts or reams a plurality of bores. In other words, the rotation of tool 2 need not be stopped or re-started between bores. Furthermore, tool 2 may be used to cut or ream a bore in a single, one-dimensional linear movement along the axis of the bore. Thus, while tool 2 is disposed within the bore, the axis of tool 2 may remain aligned with the axis of the bore during the advancement and retraction of tool 2 through the bore.

Other suitable methods for using tool 2 will be apparent to those of ordinary skill in the art.

It will be apparent to those of ordinary skill in the art that while several embodiments of the invention have been disclosed in detail, numerous other modifications and improvements may be made thereon.

For example, those of ordinary skill in the art will recognize that it is not necessary to use a pair of opposing cutting blades 20 at distal end 6. As an alternative, any other number of cutting blades 20 may be used. In an alternate embodiment, distal end 6 has a single cutting blade 20 with an opposing support pad similar to the type described in U.S. Pat. No. 6,270,295. In another alternate embodiment, distal end 6 has a single cutting blade 20 with no opposing support pad. In yet another alternate embodiment, distal end 6 has three or more cutting blades 20. In one embodiment, where distal end 6 has more than one cutting blade 20, cutting blades 20 will be spaced apart equidistantly about circumference of tool 2. In addition, tool 2 may have more than two extremities 26, each having a respective cutting blade 20. Still other suitable cutting blade 20 configurations will be apparent to those of ordinary skill in the art.

Those of ordinary skill in the art will also appreciate that tool 2 need not have any cutting blades 20 at all. In an alternate embodiment, tool 2 has rollers electroplated with or otherwise coated in diamond grit or Cubic Boron Nitride grit positioned proximate to where cutting blades 20 would be. By way of example only, tool 2 may be fitted with rollers similar to those described in U.S. Pat. No. 7,165,430, entitled "Method and Apparatus for Patterning of Bore Surfaces," issued on Jan. 23, 3007, the disclosure of which is incorporated by reference herein. In this embodiment, grit may be approximately 0.006" in size. Of course, any other size of grit or other protuberance may be used. Grit may be used to impinge a pressure on the surface of a bore wall at approximately 10,000 pounds per square inch. Of course, any other amount of pressure may be used. It will also be appreciated that any other suitable structure(s) (e.g., other than blades 20 or rollers, etc.) may be provided in or on tool 2, in addition to or in lieu of blades 20 or rollers, etc. By way of example only, tool 2 may be provided with one or more honing bars (not shown).

In addition, or in the alternative, tool 2 may be configured similar to the tool disclosed in U.S. Non-Provisional application Ser. No. 10/654,328, entitled "Tool With Selectively Biased Member and Method for Forming A Non-Axis Symmetric Feature," filed on Sep. 3, 2003, the disclosure of which is incorporated by reference herein.

As an alternative to tool 2 having plate 40A with recesses 50 opening outwardly, tool 2 may have a pair of symmetrical plates with recesses opening inwardly, such that the recesses face each other when the plates are positioned together in slot 30. In this or similar alternate embodiments, outward forces may be exerted upon extremities 26 by the plates, as the plates will be urged outwardly by the pressurized fluid.

It will also be appreciated that, while slot 30 and plate 40A have been shown in the present example as being generally rectangular, slot and plate may be of any other shape. By way of example only, slot and plate may be generally square, cylindrical, or any other substantially uniform cross-sectional shape, such as circular, elliptical, ovular, or triangular. Alternatively, slot and plate may be conical, frusto-conical, pyramid-shaped, or any other suitable shape. In one embodiment, slot 30 is generally of the same shape as plate 40A-D.

While tool 2 has been discussed as being particularly suitable for cutting bores having a relatively high length-to-diameter ratio, it will be appreciated that tool 2 is also suitable for use with bores having a relatively small length-to-diameter ratio, or any other types of bores. In addition, while tool 2 has been discussed as being suitable for cutting or reaming bores, it will be appreciated that tool 2 is also suitable for a variety of other types of machining and other operations.

Additional yet non-exhaustive variations are shown in FIGS. 11-15. In particular, FIGS. 11-15 show an alternative plate 100 that includes a needle valve 150. It will be appreciated that plate 100 may be substituted for any other plate 40A, 40B, 40C, 40D described above; and that plate 100 may be used with tool 2 or with any other components. By way of example only, plate 100 may be inserted into slot 30, and may be secured within slot 30 by dowel pins 70 or using any other suitable structures, devices, or techniques. Plate 100 of this example has proximal end 102, distal end 104, and a pair of side surfaces 106. Plate 100 also has a pair of pin openings 108 formed through side surfaces 106, each opening 108 being configured to receive a corresponding dowel pin 70.

In one embodiment, plate 100 is configured to fit in slot 30 by an interference fit. Such an interference fit may be obtained where plate 100 has a thickness that is approximately 0.001" greater than the width of slot 30, by way of example only. In one embodiment, slot 30 has a width of approximately 0.374" while plate 100 has thickness of approximately 0.375". Other suitable relative dimensions of slot 30 and plate 100 for producing any type or degree of interference fit will be apparent to those of ordinary skill in the art. Alternatively, slot 30 and plate 100 may be dimensioned such that the fit is not an interference fit. By way of example only, slot may have a width of approximately 0.375" while plate 100 has a thickness of approximately 0.374". In addition, plate 100 may be dimensioned such that its exposed outer surfaces are flush with, are recessed relative to, or protrude relative to the outer surfaces of tool 2.

In the present example, with plate 100 properly positioned within slot 30, pin openings 38 of slot 30 align with pin openings 108 of plate 100, such that dowel pins 70 may be placed through pin openings 38, 108 to secure plate 100 within slot 30. Alternatively, any other suitable configuration or technique for securing plate 100 within slot 30 may be used, including but not limited to any other suitable fasteners, other structures, or other techniques.

Plate 100 of the present example has a conduit 110 formed along its central axis. Conduit 110 extends from proximal end 102 to distal end 104. In the present example, conduit 110 is configured such that, when plate 100 is inserted in slot 30 of tool 2, conduit 110 will be in fluid communication with conduit 8 of tool 2. In the present example, conduit 110 proximally branches off into two separate sub-conduits 114, which distally terminate near the axially central position of conduit, and which proximally terminate at proximal end 102 of plate 100. Sub-conduits 114 are spaced and configured such that sub-conduits 114 will be in fluid communication with conduit 8 of tool 2 when plate 100 is inserted in slot 30 of tool 2. In other words, conduit 110 is configured to receive fluid from conduit 8 centrally and via sub-conduits 114. While two sub-conduits 114 are shown, it will be appreciated that any suitable number of sub-conduits 114 may be used, and that sub-conduits 114 may be provided in any suitable alternative arrangement. It will also be appreciated that sub-conduits 114 may simply be omitted altogether (e.g., such that only a single conduit 110 is provided, etc.).

Needle valve 150 of the present example is disposed within conduit 110, and is configured to prevent fluid from exiting conduit 110 at distal end 104; while regulating the flow rate of fluid entering conduit 110 at proximal end 102 and/or regulating the flow rate or pressure of fluid exiting plate 100. As shown, needle valve 150 has threads 152 that are configured to engage complimentary threads 112 of conduit 110. It will therefore be appreciated that needle valve 150 may be adjusted by rotating needle valve 150 within conduit 110, which will adjust the flow rate permitted by needle valve 150. As shown, needle valve 150 has a tip 154 that protrudes from proximal end 102 of plate 100. In some embodiments, when plate 100 is inserted into slot 30 of tool 2, tip 154 may protrude into conduit 8 of tool 2. In other embodiments, needle valve 150 is configured such that tip 154 does not protrude from proximal end 102 of plate 100. Other suitable variations of needle valve 150 will be apparent to those of ordinary skill in the art.

An o-ring 160 is provided between needle valve 150 and conduit 110, proximal of threads 152, 112, in the present example. O-ring 160 may prevent communication of fluid through threads 152, 112. O-ring 160 may also prevent inadvertent rotation of needle valve 150 within conduit 110. It will be appreciated that one or more O-rings 160 may be provided in any other suitable location(s), including but not limited to locations distal of threads 152, 112. Alternatively, any suitable alternative(s) to o-ring 160 may be used, or o-ring 160 may be simply omitted. It will also be appreciated that a locking feature or other structure may be provided to prevent inadvertent rotation of needle valve 150 within conduit 110.

In the present example, each side surface 106 of plate 100 has a recess 120 formed therein. A recess wall 122 is provided within recess 120 of each side surface 106. As shown, three openings 124 are formed through each recess wall 122. Openings 124 are in fluid communication with conduit 110 of plate 100. Accordingly, in the present example, fluid communicated through conduit 110 will exit through openings 124. In other words, when plate 100 is inserted in slot 30 of tool 2, such that conduit 110 of plate 100 receives fluid from conduit 8, needle valve 150 diverts the fluid to flow out through openings 124.

It will be appreciated that recess 120 may be varied in a number of ways. By way of example only, while recess 120 is shown as being generally circular, recess 120 may have any other alternative shape, including but not limited to generally rectangular like recess 50 described above, generally "T"-shaped like recess 54 described above, or any other suitable shape. In addition, while three openings 124 are shown in recess 120 of the present example, any other suitable number of openings 124 may be formed in recess 120. Furthermore, a wafer 58, such as that described above or a variation thereof, or any other object may be provided within recess 120. Other suitable variations of recess 120 will be apparent to those of ordinary skill in the art.

In the present example, when plate 100 is inserted in slot 30 of tool 2, fluid exiting openings 124 will exert outward forces upon side surfaces 36 of slot 30, which will in turn result in outward movement, deflection, or bending of extremities 26. Such movement, deflection, or bending of extremities 26 in the present example will result in an increase in the diametric distance between cutting blades 20. In the present example, the degree to which cutting blades 20 will be separated is a function of the flow rate or pressure of fluid exiting openings 124.

As will be appreciated by those of ordinary skill in the art, needle valve 150 may be used to adjust the flow rate or pressure of fluid exiting openings 124 by rotating needle valve 150 relative to plate 100 to change the axial position of needle valve 150 within plate 100. As will also be appreciated by those of ordinary skill in the art in view of the teachings herein, the degree to which cutting blades 20 will be diametrically separated by fluid exiting openings 124 (and impinging upon side surfaces 36 of slot 30 to cause movement, deflection, or bending of extremities 26) may be a function of the axial position of needle valve 150 within plate 100. In other words, the degree to which cutting blades 20 will be diametrically separated may be adjusted by rotating needle valve 150 within plate 100 to a desired axial position within plate 100. To facilitate such rotation of needle valve 150 in the present example, needle valve 150 has a head 154. Head 154 is configured to engage with a wrench, socket, or other device or structure, to rotate needle valve 150 for adjustment of the axial position of needle valve 150 within plate 100, as will be described in greater detail below.

In some embodiments, a tool 2 having plate 100 is used in machining centers (not shown) that include a fluid supply system (not shown) to provide fluid to conduit 8 of tool 2 and conduit 110 of plate 100. Such fluid may be communicated from the fluid supply system via a spindle (not shown) that is used to rotate tool 2. Such components are described in greater detail in U.S. Pat. No. 5,775,853 and U.S. Pat. No. 6,270,295, each of which have been incorporated by reference herein. In some such machining centers, the pressure and/or flow rate of fluid that is communicated to tool 2 is adjustably varied by the fluid supply system. In others, the pressure and/or of fluid that is communicated to tool 2 is not adjustably varied (e.g., the fluid simply flows from the supply at a constant rate or pressure, or it does not flow at all, with no ability to adjust). Tool 2 of the present example may be used with either type of fluid supply systems, among others.

In one embodiment, tool 2 is used in a machining center that includes a fluid supply that permits adjustable variation of the fluid pressure and/or flow rate. In this embodiment, the degree to which cutting blades 20 will be diametrically separated may be adjusted in either or both of two ways: (1) adjusting the flow rate or fluid pressure of fluid communicated from the fluid supply; and/or (2) adjusting the axial position of needle valve 150 within plate 100, such as by rotating needle valve 150 within plate 100 via head 154. Suitable combinations and parameters for combining such ways of adjusting the diametric separation of cutting blades 20 will be apparent to those of ordinary skill in the art. Of course, either way may be used at the exclusion of the other in alternative embodiments. Still additional ways in which the diametric separation of cutting blades 20 may be adjusted will be apparent to those of ordinary skill in the art.

In another embodiment, tool 2 is used in a machining center that includes a fluid supply that does not permit adjustable variation of the fluid pressure and/or flow rate. In this embodiment, the diametric separation of cutting blades 20 may be adjusted by adjusting the axial position of needle valve 150 within plate 100, such as by rotating needle valve 150 within plate 100 via head 154. Other ways in which the diametric separation of cutting blades 20 may be adjusted in such embodiments will be apparent to those of ordinary skill in the art. It will also be appreciated that, in some but not all embodiments, it may be desirable to adjust needle valve 150 to adjust the diametric separation of cutting blades 20 when the adjustability of the flow rate and/or pressure of fluid from a fluid supply is not satisfactory.

Figure 15:
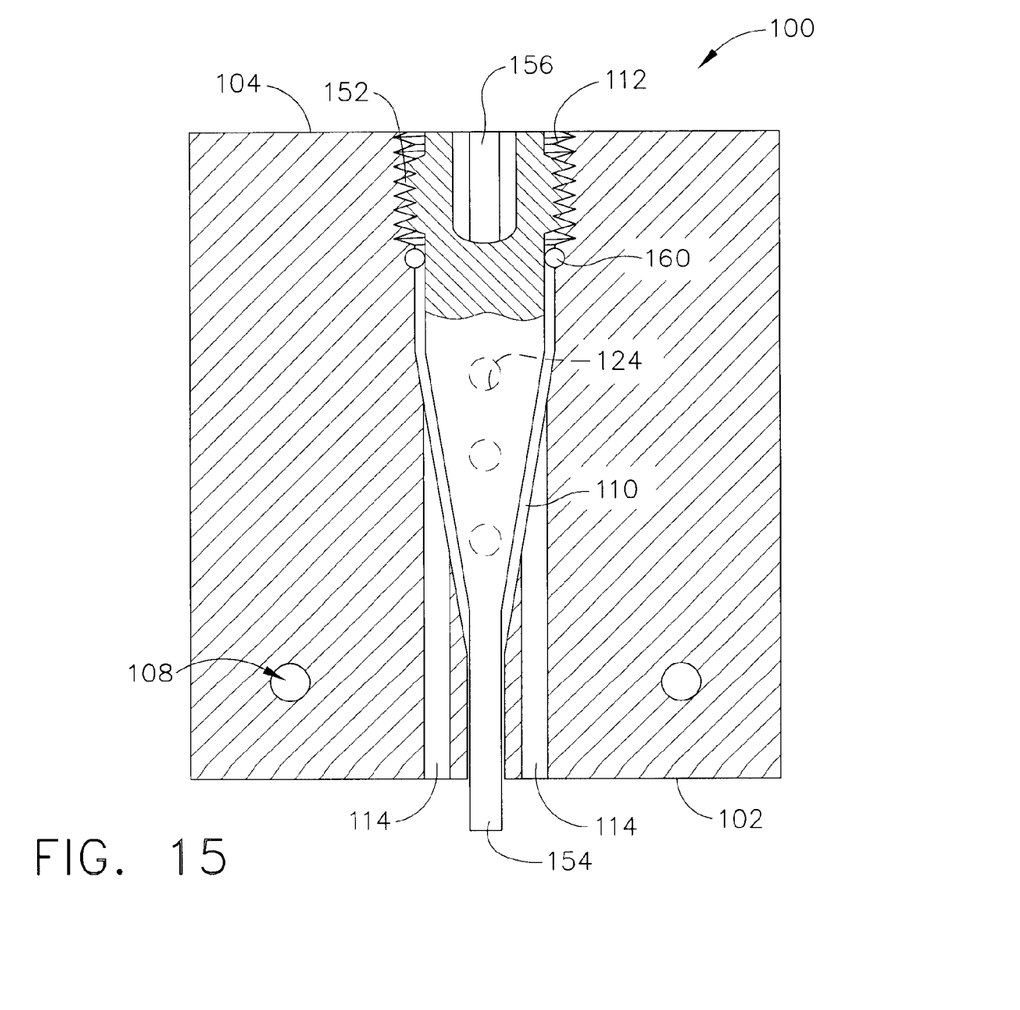
FIG. 15 is a cross-sectional view of the plate of FIG. 11, with an alternative needle valve.

In an alternate embodiment, depicted in FIG. 15, needle valve 150 has a recess 156 formed in its distal end in lieu of a protruding head 154. In this embodiment, an alien wrench (hex key) or other suitable tool may be inserted into recess 156 to engage the interior of recess 156, to thereby rotate needle valve 150 and adjust its axial position within plate 100. It will be appreciated that recess 156 may have any other suitable configuration, and that any other suitable tool or device may be used to engage the interior recess 156. Furthermore, other suitable alternatives to head 154 and recess 156 will be apparent to those of ordinary skill in the art.

In some embodiments, a machining station includes an adjuster feature (not shown) that may be used to engage needle valve 150, such as to rotate needle valve 150 and thereby adjust its axial position within plate 100. Such an adjuster feature may comprise a component that is similar to, but need not be limited to, any of the following: socket, box wrench, allen wrench (hex key), torx wrench/key, robertson wrench/key, tri-wing wrench/key, torq-set wrench/key, spanner head wrench/key, or any other suitable structure. It will be appreciated that the configuration of such an adjustment feature within machining station may be selected to correspond with the configuration of head 154, of recess 156, or of some other feature of needle valve 150.

It will also be appreciated that, where an adjuster feature of a machining station may be used to selectively adjust needle valve 150, a spindle to which a tool 2 is secured may be automatically advanced to cause needle valve 150 to engage such an adjuster feature. Alternatively, the adjuster feature may be configured to move toward needle valve 150 and thereby engage needle valve for adjustment of needle valve 150. In either or both scenarios, once the adjuster feature is engaged with needle valve 150, the adjuster feature and/or the spindle may be moved to rotate needle valve 150 within plate 100, to thereby adjust the axial position of needle valve 150 within plate 100. Furthermore, such adjustments may be made multiple times during a single machining process. For instance, where bores of different diameters need to be machined into a single workpiece, a single tool 2 may be used to machine such bores in a single process, simply by causing automatic adjustment of needle valve 150 using an adjuster feature in the machining station as described above. In other words, to the extent that the machining station accepts complex work routine instructions (e.g., via a computer), adjustments to needle valve 150 may be provided within such instructions to cause such adjustments to occur automatically during a single machining process. It will therefore be appreciated that bores of different diameters may be created using a single tool 2 (e.g., no tool 2 change required) in a single machining process, without needing to adjust the pressure or flow rate of fluid "downstream" or "upstream" of tool 2. Of course, other ways in which tool 2 may be used will be apparent to those of ordinary skill in the art.

While several of the present examples include a needle valve 150 for adjusting the flow rate or pressure of fluid within plate 100, it will be appreciated that a variety of alternative structures or devices may be used to adjust the flow rate or pressure of fluid within plate 100. Such alternatives may include, but are not limited to, other types of valves or flow restriction devices or structures. Accordingly, the inventors do not intend for all embodiments to be limited to needle valves 150, and the inventors instead contemplate a variety of alternative structures and devices that may be used.

In summary, numerous benefits have been described which result from employing the concepts of the invention. The foregoing description of one or more embodiments of the invention has been presented for purposes of illustration and description. It is not intended to be exhaustive or to limit the invention to the precise form disclosed. Obvious modifications or variations are possible in light of the above teachings. The one or more embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A tool for working a workpiece, the tool comprising:
   (a) an elongate member comprising:
      (i) a central axis defining axial, angular, and radial directions,
      (ii) first and second ends,
      (iii) at least two extremities located at the first end, at least one of the at least two extremities comprising at least one blade member,
      (iv) a slot adjacent the at least two extremities, wherein the slot extends toward the second end and opens at the first end, the slot being configured to receive an insert member, and
      (v) a conduit, wherein the conduit is in fluid communication with the slot; and
   (b) an insert member positioned in the slot, the insert member comprising two sides, wherein the insert member is configured to direct fluid communicated to the slot toward one or more of the at least two extremities, wherein the insert member comprises an adjustment feature, wherein the adjustment feature is operable to selectively adjust one or both of the flow rate or pressure of the fluid communicated via the insert member toward one or more of the at least two extremities.

2. The tool of claim 1, wherein the insert member comprises a plate having the two sides.

3. The tool of claim 2, wherein the plate has a first end and a second end, wherein each side of the plate has at least one opening formed therein, wherein the plate further comprises at least one channel extending from the second end of the plate to each of the openings, the channel being configured to communicate fluid from the conduit to each of the openings.

4. The tool of claim 3, wherein each side of the plate further comprises a recessed portion, wherein the openings are provided in each respective recessed portion.

5. The tool of claim 4, further comprising at least one wafer disposed in each recessed portion.

6. The tool of claim 1, wherein the adjustment feature comprises a needle valve disposed at least partially within the insert member.

7. The tool of claim 6, wherein the needle valve has a recessed head portion.

8. The tool of claim 1, wherein the insert member is configured to vary the distance between the at least one blade member and the central axis as a function of pressure of the fluid.

9. A tool system for working a workpiece, the tool system comprising:
   (a) a tool, comprising:
      (i) a central axis which defines axial, angular, and radial directions,
      (ii) at least one blade member including a blade configured to remove material from a workpiece, said at least one blade member being substantially constrained in the axial and angular directions, said at least one blade member being configured to move through a range of travel in the radial direction, and
      (iii) at least one inserted member positioned in line with the central axis adjacent said at least one blade member, wherein the inserted member is operable to direct a pressurized fluid to selectively bias the at least one blade member in the radial direction to at least one of a plurality of alternative use positions, wherein the inserted member comprises an adjustment device, wherein the adjustment device is operable to selectively adjust one or both of the flow rate or pressure of the pressurized fluid to selectively bias the at least one blade member;

(b) a rotary actuation device configured to drive the tool to rotate about its central axis; and (c) a pressurized fluid supply in fluid communication with the at least one inserted member for providing the pressurized fluid to selectively bias the at least one blade member in the radial direction to at least one of a plurality of alternative use positions.

10. The tool system of claim 9, further comprising a slot positioned in the tool along the central axis, wherein the inserted member is disposed in the slot.

11. The tool system of claim 9, wherein the inserted member comprises a plate having two sides, wherein each side of the plate has at least one opening formed therein, wherein the plate further comprises at least one channel extending from a proximal end of the plate to the openings, the at least one channel being configured to communicate the pressurized fluid to the openings.

12. The tool system of claim 11, wherein the adjustment device comprises a needle valve disposed at least partially within the plate.

13. The tool system of claim 12, wherein the position of needle valve is adjustable along the axial direction defined by the central axis.

14. The tool system of claim 9, wherein the blade member is mounted to an extremity of the tool, wherein the pressurized fluid has a flow, wherein the inserted member is configured to direct the flow of the pressurized fluid toward the extremity.

15. A tool, comprising an elongate member, the elongate member comprising:

(a) first and second ends positioned on a tool axis, the second end being configured to couple with a rotary actuation device;

(b) a conduit in fluid communication with the second end and the first end;

(c) one or more cutting members located proximate to the first end, each of the one or more cutting members being positioned at a respective first distance from said tool axis;

(d) a plate positioned proximate to the first end, the plate comprising two sides, each of said two sides having at least one opening formed therein, each opening being configured to receive a fluid medium from the conduit, wherein said plate is configured to divert flow of the fluid medium to cause at least one of said one or more cutting members to be positioned at a second distance from said tool axis; and (e) a fluid adjustment member, wherein the fluid adjustment member is operable to selectively adjust the flow rate or pressure of fluid diverted to cause at least one of said one or more cutting members to be positioned at the second distance from said tool axis.

16. The tool of claim 15, wherein the fluid adjustment member comprises a needle valve.

17. The tool of claim 16, wherein the needle valve defines a longitudinal axis, wherein the longitudinal axis defined by the needle valve is aligned with the tool axis.

18. The tool of claim 15, further comprising two or more extremities, wherein the one or more cutting members are positioned on at least one of the two or more extremities.

19. The tool of claim 18, further comprising a slot positioned adjacent the two or more extremities, wherein the plate is positioned within the slot.

20. The tool of claim 19, wherein the slot and the plate are positioned along the tool axis.

* * * * *